United States Patent [19]

Verdier

[11] Patent Number: 5,225,152
[45] Date of Patent: Jul. 6, 1993

[54] FILTERING BOTTOM NOZZLE FOR A FUEL ASSEMBLY OF A LIGHTWATER-COOLED REACTOR

[75] Inventor: Michel Verdier, Villeurbanne, France

[73] Assignees: Framatome, Courbevoie; Cogema, Velizy Viblacoublay, both of France

[21] Appl. No.: 795,012

[22] Filed: Nov. 20, 1991

[30] Foreign Application Priority Data

Nov. 20, 1990 [FR] France .................... 90 14454

[51] Int. Cl.$^5$ ............................. G21C 1/04
[52] U.S. Cl. .................. 376/352; 376/310; 376/313
[58] Field of Search ........... 376/310, 352, 313, 365; 976/DIG. 268, DIG. 207

[56] References Cited

U.S. PATENT DOCUMENTS

| | | | |
|---|---|---|---|
| 4,053,359 | 10/1977 | Pennell et al. | 376/365 |
| 4,096,032 | 6/1978 | Mayers et al. | 376/313 |
| 4,664,880 | 5/1987 | Bryan | 376/352 |
| 4,684,495 | 8/1987 | Wilson et al. | 376/352 |
| 4,832,905 | 5/1989 | Bryan et al. | 376/352 |

FOREIGN PATENT DOCUMENTS

| | | |
|---|---|---|
| 0311037 | 4/1987 | European Pat. Off. . |
| 0392919 | 10/1990 | European Pat. Off. . |
| 2656456 | 6/1991 | France . |

*Primary Examiner*—Donald P. Walsh
*Assistant Examiner*—Meena Chelliah
*Attorney, Agent, or Firm*—Pollock, Vande Sande & Priddy

[57] ABSTRACT

The nozzie (8) comprises a transverse element consisting of a cross-braced structure (14) comprising wall elements (15) delimiting cells (16) of large dimensions. Ends of a plurality of mutually parallel leaves (18) are fixed to the inside walls of each of the cells (16) so that their faces are substantially parallel to the direction of circulation of the cooling water through the nozzle (8). The leaves (18) provide between them spaces of a width which is less than the size of the particles likely to be entrained in the cooling fluid and to lodge in the fuel assembly.

14 Claims, 5 Drawing Sheets

FIG.7

FILTERING BOTTOM NOZZLE FOR A FUEL ASSEMBLY OF A LIGHTWATER-COOLED REACTOR

FIELD OF THE INVENTION

The invention relates to a filtering bottom nozzle for a fuel assembly of a light water-cooled nuclear reactor and, in particular, for a fuel assembly of a pressurized water nuclear reactor.

BACKGROUND OF THE INVENTION

Pressurized water nuclear reactors comprise a core consisting of prismatic assemblies disposed side-by-side in a vertical position. The assemblies comprise a framework consisting of longitudinal guide tubes and spacer grids and are closed by nozzles in which the fuel rods are disposed.

One of the nozzles of the assembly, called the bottom nozzle, rests on the lower core plate which is perforated with holes at the level of each of the assemblies in order to permit the passage of the cooling water of the reactor through the core, upwards in a vertical direction.

This nozzle comprises support legs which rest on the lower plate of the core and an element positioned transversely relative to the direction of the fuel rods of the bundle, integral with the support legs. This transverse element consists of an adapter plate in which are fixed the bottom ends of the guide tubes of the assembly and which has through-openings permitting the passage and ensuring the distribution of the cooling water of the reactor which circulates in a vertical direction and in contact with the outer surface of the rods of the assembly, after passing through the bottom nozzle.

The adapter plate of the bottom nozzle of the fuel assembly of a water-cooled reactor thus contributes to the strength of the framework of the assembly and ensures that the forces exerted on the bottom nozzle are taken up, and particularly that the weight of the framework and of the bundle which is transmitted via the guide tubes to the adapter plate, to the support legs and to the lower core plate is taken up; the adapter plate must, moreover, permit the passage and the distribution of the cooling water of the assembly.

The adapter plate is principally subject to bending stresses and undergoes considerable stresses, in particular in the vicinity of its top face and of its bottom face. This plate, produced in a single piece, must have considerable thickness in order to give great strength to the bottom nozzle.

The adapter plate must also hold the fuel rods of the assembly in the event that some of these rods are no longer held efficiently enough by the holder elements of the spacer grids and tend to slide in the axial direction of the bundle, through the action of their weight.

As the water-passage holes passing through the adapter plate generally have a diameter greater than the diameter of the fuel rods, it is necessary to provide a network of holes in positions which are offset relative to the transverse positions of the fuel rods, so that each of the fuel rods is located vertically in line with a solid part of the adapter plate.

Even if all or some of the holes passing through the adapter plate have a diameter less than and even markedly less than that of the fuel rods, it is desirable to avoid placing these small-diameter holes vertically in line with the fuel rods which, in the event of accidental drop, risk blocking one or more water passages and thus locally reducing or preventing the cooling of the fuel rods by water circulation.

Moreover, given the thickness of the adapter plate, it is necessary to provide water-passage holes such that the loss of head of the cooling water through the bottom nozzle is as low as possible.

It is extremely difficult to design an adapter plate which can meet all of these mechanical end hydraulic requirements.

Machining of the adapter plate is an extremely delicate operation which requires a high degree of precision.

Debris particles may be present in the primary circuit of the reactor and are liable to be entrained by the pressurized water in circulation. If their size is small (for example, smaller than 10 mm), these debris particles can pass through the adapter plate of the bottom nozzle whose water-passage holes have a diameter generally larger than 10 mm. These debris particles may become wedged between the fuel rods and the elements holding the rods at the level of the first grid, i.e. of the spacer grid holding the rods in a uniform pattern disposed at the lowest point in the assembly. These particles, subject to axial and transverse hydraulic stresses which are considerable in this zone, can wear the cladding of the fuel rod, producing a risk of loss of leaktightness and an increase in the activity level of the primary circuit of the reactor.

In order to avoid the entrainment of these particles inside the assembly, it has been proposed to filter the cooling fluid at the level of the adapter plate of the bottom nozzle by providing holes passing through this adapter plate, the diameters of which are sufficiently small to stop debris likely to become wedged in the first grid of the assembly.

However, in order to ensure the passage of the flow of cooling fluid through the adapter plate, with a moderate loss of head, it is necessary to provide a very dense pattern of through holes, which further complicates machining of the adapter plate.

As described in European Patent Application EP-A-0,311,037, it is also possible to provide openings of large dimensions passing through the adapter plate and to dispose, inside these openings, filtration grids making it possible to stop the debris entrained by the cooling water of the reactor.

The bottom nozzles of the fuel assemblies may be produced in a single piece, by machining a molded piece, or, from several molded or machined pieces which are assembled together by welding In the latter case, it may be particularly advantageous to carry out the welding using an electron beam or a laser.

The nozzles of the assembly may consist, for example, of a cross-braced structure limited on the outside by a frame, whose section substantially corresponds to the transverse section of the assembly, and having walls connected together and to the frame which delimit cells of large dimension introducing only a negligeable loss of head in the circulation of the cooling water of the reactor. A plate of small thickness which can be press-cut is mounted and fixed on one of the faces of the cross-braced structure in a removable manner. In order to regulate the flow of the cooling water through the nozzle, the plate is perforated with openings whose shape, dimensions and arrangement make it possible to set the loss of head and the distribution of the water passing through the nozzle.

French Patent Publication No. 2,656,456 discloses a bottom nozzle of a fuel assembly comprising a transverse element for taking up stresses and retaining the fuel rods, consisting of a cross-braced structure which is resistant to bending and a retention plate of small thickness relative to the thickness of the cross-braced structure, perforated with a regular pattern of openings of a size which is sufficiently small to stop debris likely to be entrained by the cooling water of the reactor and capable of becoming lodged inside the assembly. The transverse element of the box-shaped nozzle makes it possible to provide, between the cross-braced structure and the plate for retaining the debris, a free space where the flow of cooling water of the reactor is stilled and where the debris is recovered.

A nozzle of this type has the drawback of being produced in the form of a sandwich and of consequently having a relatively considerable thickness in the axial direction of the nozzle. A nozzle of this type is likely to restrict the possibilities for enlargement of the rods, which may give rise to certain limitations of use of the fuel assemblies, in the case of high burning fractions.

SUMMARY OF THE INVENTION

The object of the invention is thus to propose a filtering bottom nozzle for a fuel assembly of a light water cooled nuclear reactor, comprising a transverse element for taking up stresses and retaining the rods, consisting of a cross-braced structure which is resistant to bending, limited on the outside by a frame whose section is substantially identical to the transverse section of the assembly, and having walls delimiting cells which form openings for the passage of the cooling water of the assembly, this nozzle having satisfactory hydraulic characteristics and a reduced bulk in the longitudinal direction of the assembly and making it possible to provide efficient filtration of the debris entrained by the cooling water of the reactor.

To this end, the bottom nozzle according to the invention comprises, inside each of the cells of the cross-braced structure, a plurality of mutually parallel leaves fixed on the walls of the cells at their ends so that their faces are substantially parallel to the direction of circulation of the cooling water and so as to provide between them spaces of a width which is less than the size of the particles likely to be entrained by the cooling fluid and to become lodged inside the assembly.

BRIEF DESCRIPTION OF THE DRAWINGS

In order to make the invention more easily comprehensible, a description will now be given, by way of example, with reference to the accompanying drawings, of a fuel assembly comprising a bottom nozzle according to the invention and several embodiments of the bottom nozzle according to the invention.

DESCRIPTION OF PREFERRED EMBODIMENTS

Figure 1:
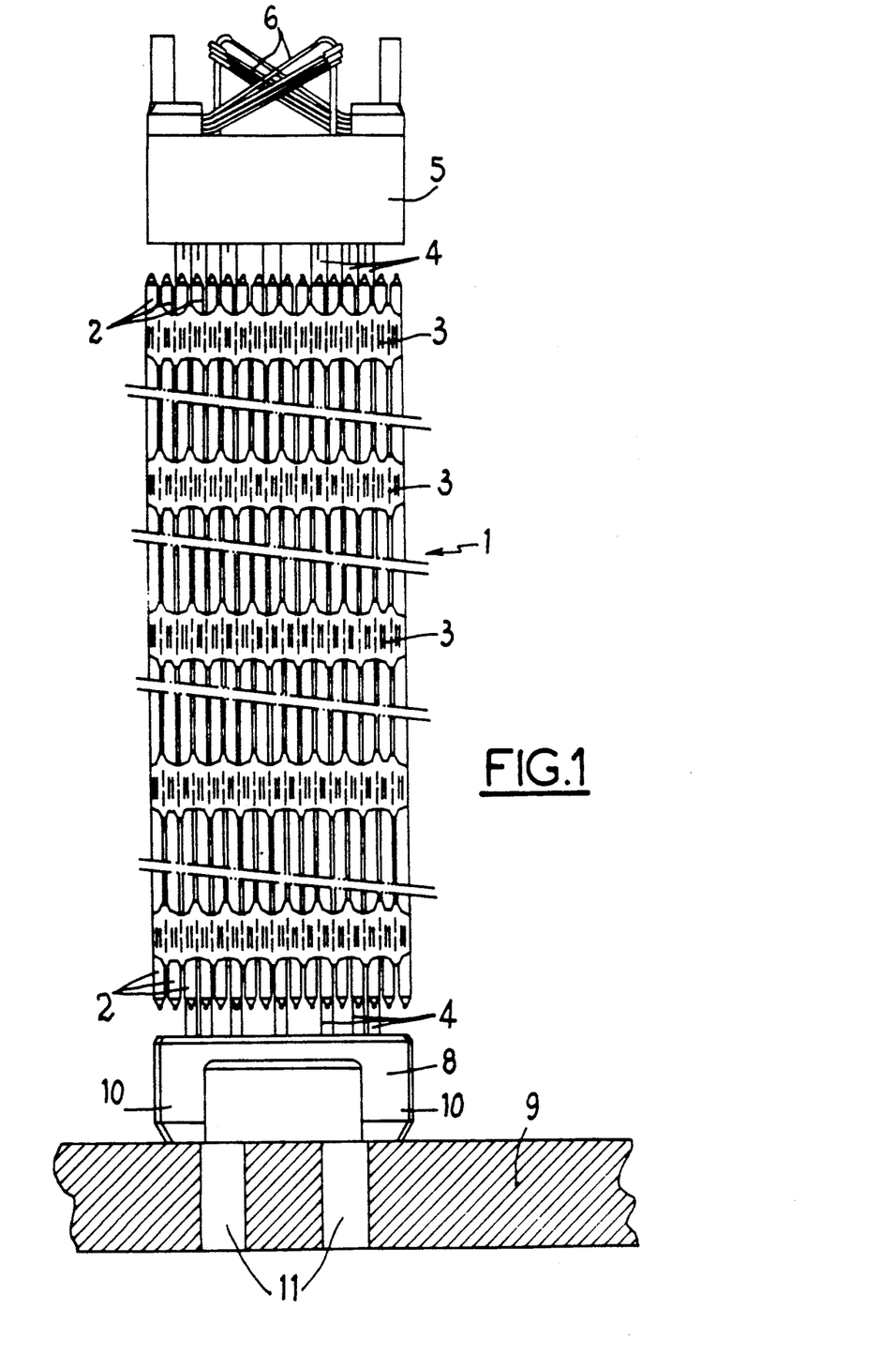
FIG. 1 is a view in elevation of a fuel assembly for a pressurized-water nuclear reactor resting on the lower core plate of the reactor.

FIG. 1 shows a fuel assembly of a pressurized-water nuclear reactor 1. This fuel assembly comprises a bundle of fuel rods 2 held in a parallel arrangement by spacer grids 3 which are uniformly spaced over the length of the bundle.

The grids 3 hold the rods 2 in a uniform pattern in the transverse planes of the bundle perpendicular to the longitudinal direction of the assembly.

Certain positions of fuel rods in the pattern defined by the grids 3 are occupied by guide tubes 4 having a length which is greater than the length of the fuel rods.

At each of their ends, the guide tubes 4 comprise a part which projects relative to the ends of the rods 2 of the bundle A top nozzle 5 is fixed on the end parts of the guide tubes 4 located above the bundle. The top nozzle 5 of the assembly comprises springs 6 which make it possible to hold the fuel assembly 1 under the upper core plate of the reactor, which bears on the springs 6 of the assemblies after core loading. The springs 6 are, moreover, capable of being deformed in order to permit longitudinal expansion of the assembly inside the core of the reactor.

The ends of the guide tubes 4 which project below the bundle of rods are connected to a bottom nozzle 8 which rests by means of support legs 10 on the lower core plate 9 of the reactor when the assembly 1 is in place in the core of the reactor.

The lower core plate 9 has water-passage through openings 11 vertically in line with the bottom nozzle of each of the fuel assemblies 1. The bottom nozzle 8 comprises an element for taking up stresses and for holding the rods 2 having a transverse arrangement relative to the assembly on which the ends of the guide tubes 4 are fixed.

The stresses exerted by the fuel assembly and, in particular, the weight of the assembly are transmitted to the lower core plate 9 by means of the guide tubes 4 and the transverse element and the support legs of the bottom nozzle 8.

The cooling water of the assembly passes through the lower core plate 9 via the openings 11, then the transverse element of the nozzle 8, before circulating between the rods 2 of the bundle of the assembly.

If the transverse element of the bottom nozzle of a fuel assembly is in the form of a cross-braced structure with an associated superposed filtration plate superposed on the cross-braced structure, plate introduces a considerable loss of pressure head in the circulation of the cooling fluid, such that the vertical stresses of hydraulic origin exerted on the assembly by the cooling fluid are liable to become too great for the springs holding the assembly to be able to prevent raising of the assembly above the lower core plate. In fact, the efficiency of filtration requires that the diameter of the holes passing through the filtration plate be limited to a small value, for example of the order of 3 mm.

Figure 2:
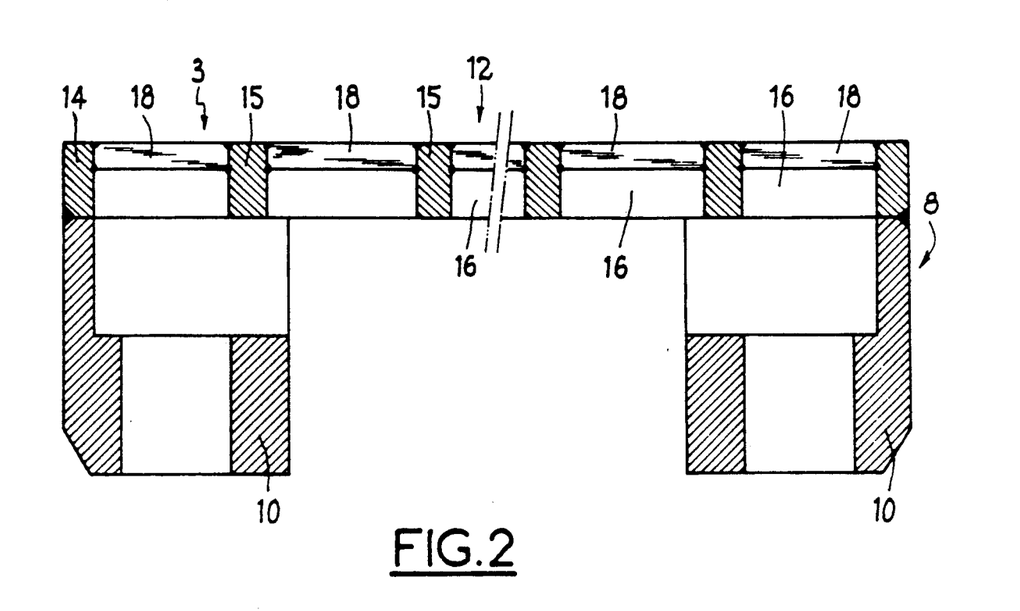
FIG. 2 is a sectional view in a vertical plane of a filtering bottom nozzle according to the invention.

FIG. 2 shows a bottom nozzle 8 of a fuel assembly, according to the invention, which makes it possible to avoid the drawbacks of prior art bottom nozzles comprising a transverse element consisting of a cross-braced structure and a filtration plate superposed on the structure.

The nozzle 8 according to the invention comprises a transverse element 12 for taking up the stresses and for holding the fuel rods, and support legs 10 weld to the lower face of the transverse element 12.

Figure 3:
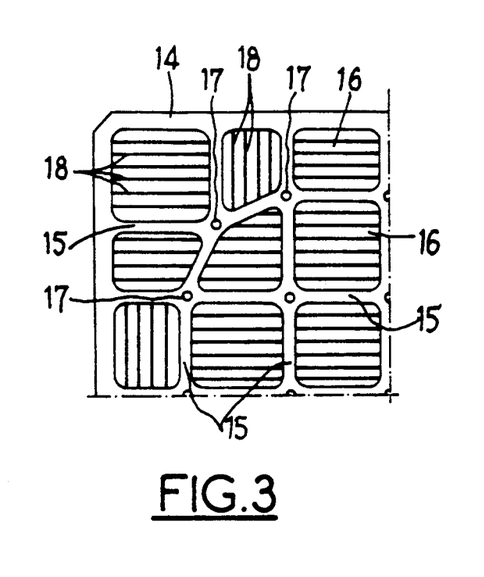
FIG. 3 is a partial top view, in the direction of arrow 3, of the nozzle shown in FIG. 2.

As shown in FIGS. 2 and 3, the transverse element 12 of the nozzle 8 consists of a structure 14 comprising walls 15 delimiting cells 16 whose sections have the shape of quadrilaterals with rounded corners.

The cross-braced structure 14 is limited on the outside by a square frame whose dimensions substantially correspond to the dimensions of the transverse section of the fuel assembly 1.

The walls 15 of the cells 16 of the structure 14 are connected together at the level of the corners of the cells 16 to form joining intersections which have through-openings 17 permitting the fixing of the guide tubes of the assembly on the transverse element 12 of the bottom nozzle 8.

The walls 15 have a relatively small thickness compared with the dimensions of the cells 16, so that the surface of the group of cells 16 is large compared with the total surface of the nozzle.

The highly perforated structure 14 thus introduces a relatively low loss of head in the circulation of cooling water through the nozzle 8.

The cross-braced structure 14 has great rigidity on bending, despite the relatively small thickness of the wall 15 delimiting the cells 16, making it possible satisfactorily to transmit to the support legs 10 and to the lower core plate the mechanical stresses and weight of the fuel assembly transmitted by the guide tubes of the assembly.

The transverse element 12 of the nozzle 8 must also homogeneously distribute the coolant inside the assembly, with as low a loss of pressure head as possible, must stop debris likely to damage the fuel rods and limit the axial clearance of the fuel rods which are displaced by sliding inside the spacer grids, through the action of enlargement.

In order to enable the transverse element 12 to perform these functions, according to the invention, metal leaves 18 are fixed inside each of the cells 16, in the upper part of the cells, the upper edge of the leaves 18 being placed at the plane upper surface of the transverse element 12.

The leaves 18 are disposed parallel to one another inside each of the cells 16, in a direction corresponding to the direction of two opposite parallel walls of the cell 16.

Considering the cells 16 of the transverse element 12 as a whole, the leaves 18 may be placed in one or the other of two directions parallel to two opposite faces of the frame of square shape of the structure 14. The metal leaves 18 are fixed on the walls 15 of the cells, at their ends, so that the faces of the leaves 18 are parallel or substantially parallel to the direction of circulation of the fluid through the bottom nozzle 8, i.e., the longitudinal direction of the assembly.

The metal leaves 18 together delimit rectangular spaces having a width is smaller than the size of the debris likely to become wedged inside the fuel assembly between the fuel rods and the walls of the grids.

In the case of conventional fuel assemblies type, for pressurized-water nuclear reactors, it is possible to use metal leaves 18 having a thickness of 0.5 mm jointly delimiting rectangular spaces having a width of 3 mm.

Figure 4:
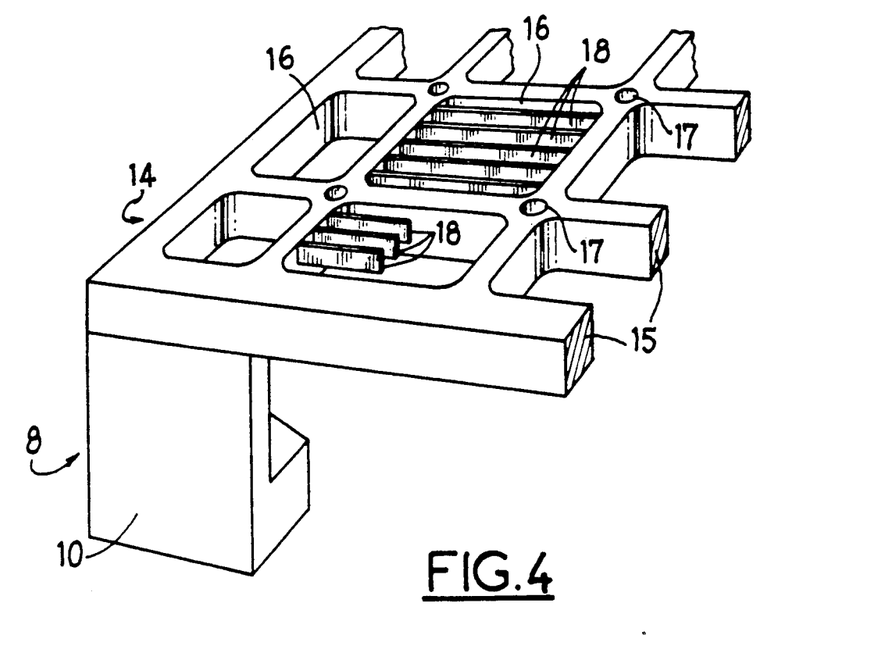
FIG. 4 is a partial perspective view with cutaway of a filtering nozzle according to the invention and according to a first embodiment.

FIG. 4 shows a cross-braced structure 14 comprising cells 16 in which metal leaves 18 are fixed directly on the walls 15 by means of their ends, and independently of one another.

Figure 4A:
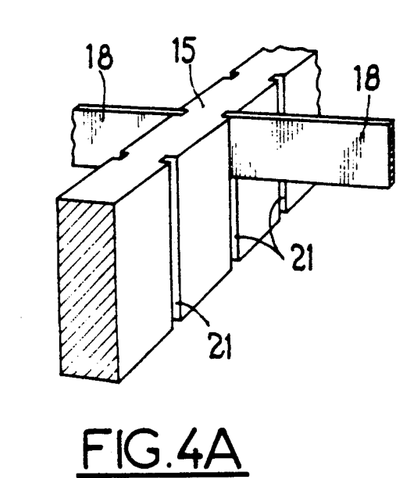
FIGS. 4A and 4B are detailed perspective views showing two different methods of fixing the leaves of the filtering nozzle, shown in FIG. 4.

FIG. 4A shows a first method of fixing the end parts of the leaves 18 on the walls 15, the walls 15 comprising longitudinal slots 21 uniformly spaced over the length of the walls 15 and having a width substantially equal to or very slightly greater than the thickness of the leaves 18.

The ends of each of the leaves 18 are introduced into two slots 21 disposed opposite each other on two opposite walls 15 of a cell 16 of the structure 14. The ends of the metal leaves 18 introduced into the slots 21 are fixed on the walls 15 by brazing inside the slots 21.

Figure 4B:
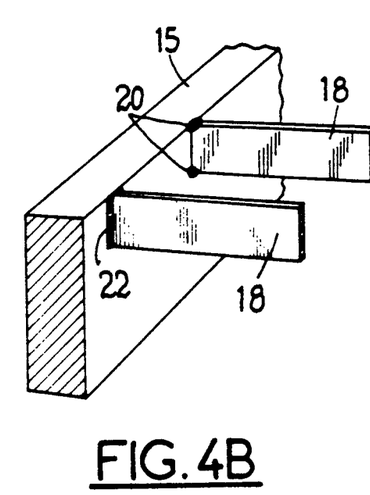

FIG. 4B shows the end parts of two metal leaves 18 which are attached by welding on a wall 15 delimiting a cell 16 of the structure 14. One of the leaves 18 is fixed on a surface of the wall 15 by welding spots 20 and the other leaf 18 by a weld bead 22.

In the case of attachment by welding, as shown in FIG. 4B, it is unnecessary to machine the walls 15 in order to produce parallel slots 21, the ends of the leaves 18 being mounted directly on the wall 15 of the cell 16.

The leaves 18 are fixed one after the other in parallel arrangements inside each of the cells 16 of the structure 14.

Figure 5:
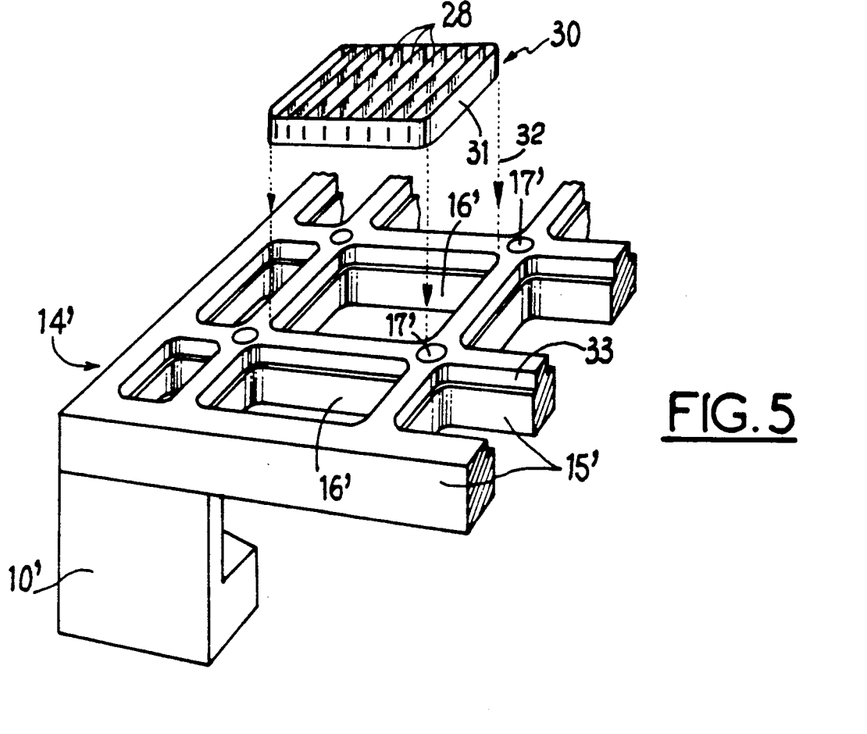
FIG. 5 is an exploded partial perspective view of a filtering nozzle according to the invention and according to a second embodiment.
Figure 5A:
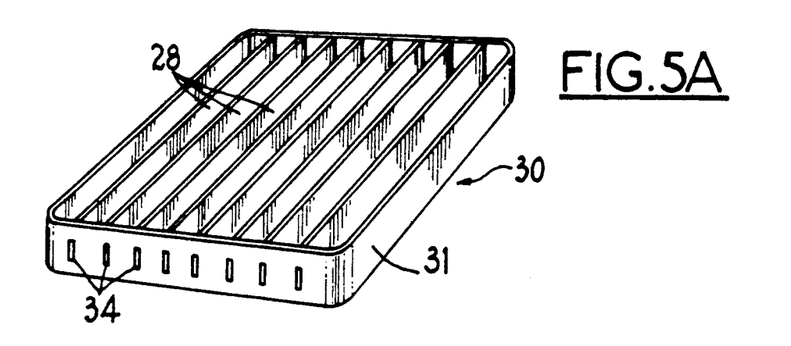
FIGS. 5A and 5B are perspective views of two modular filtration elements of a nozzle according to the invention and according to two alternative embodiments.
Figure 5B:
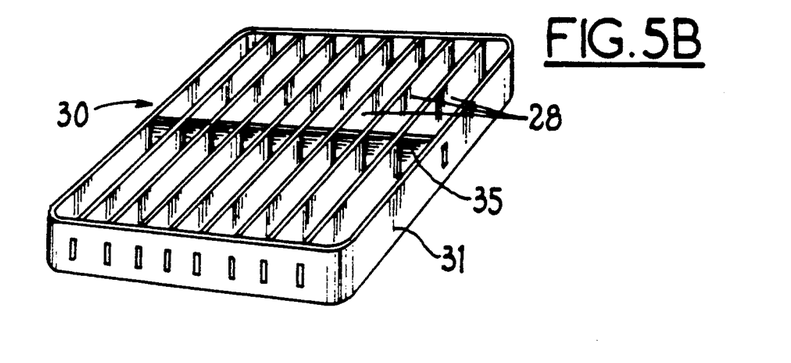

In the production of a bottom nozzle of a fuel assembly as shown in FIGS. 5, 5A and 5B, comprising a cross-braced structure 14' and metal leaf groups 28 disposed in its cells 16', each of the leaf groups 28 disposed in a cell 16' of the structure 14' forms a modular element 30, the leaves 28 being fixed at their ends on two opposite walls of a frame 31 whose shape corresponds to the shape of the cell 16 in which the element 30 is disposed, by simple engagement, as shown by the arrows 32 in FIG. 5.

The walls 15' of the structure 14' are machined in their upper part to form, inside each of the cells 16', a housing 33 permitting the embedding of the frame 31 of a modular element 30 comprising a group of leaves 28.

After engagement and embedding in a housing 33 of a cell 16', the frame 31 of the modular element 30 is welded or brazed on the corresponding walls 15' of the cross-braced structure 14'.

The leaves 28 may be cut out from a steel strip and fixed at their end on two opposite faces of a frame 31, by brazing or by welding.

The frame 31 of the modular element 30 on which the leaves 28 are fixed may be produced by folding and welding a steel strip which may be identical to the steel strip from which the leaves 28 have been cut out.

The ends of the leaves 28 may be engaged in slots 34 passing through two opposite walls of the frame 31, in positions located opposite each other, in order to permit assembly of the leaves 28 and the frame 31, by welding or by brazing, outside the frame 31.

The leaves 28 are placed in parallel arrangements and in such a way as to delimit between them rectangular spaces whose width is less than the size of the particles it is desired to retain, at the level of the bottom nozzle of the fuel assembly.

FIG. 5B shows an alternative embodiment of a modular element 30, comprising a frame 31 and a group of parallel leaves 28 fixed at their ends on two opposite faces of the frame 31.

A reinforcement element 35, fixed at its ends on two opposite faces of the frame 31 and comprising slots in each one of which a leaf 28 is engaged, makes it possible to hold the leaves 28 so as to preserve their spacing and to reduce their transverse displacement through the action of the flow of cooling water or as a result of the fuel rods of the assembly bearing on the bottom nozzle.

The modular element 30 intended to be introduced into the cells 16' of the structure 14' may be produced as a single piece, by machining a thick metal sheet using a method such as electroerosion, electrochemistry or cutting out using an abrasive jet of water, as a replacement for a method of assembling metal plates cut out from a steel strip.

Figures 6A, 6B:
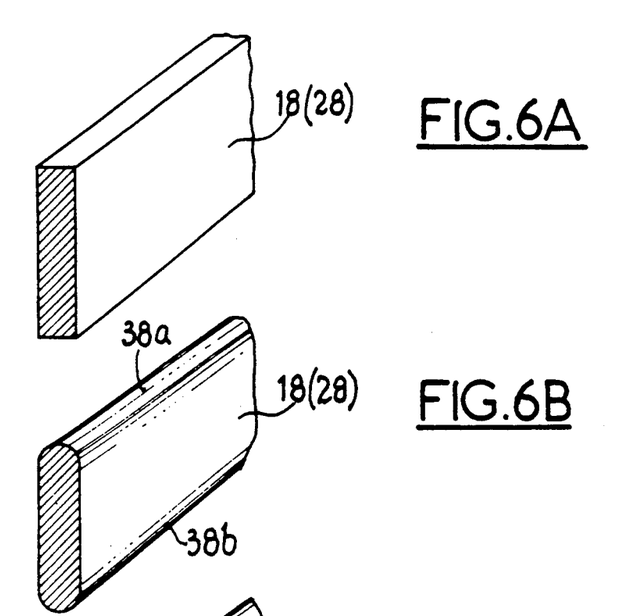
FIGS. 6A, 6B and 6C are perspective views of leaves of a nozzle according to the invention, according to three alternative embodiments.
Figure 6C:
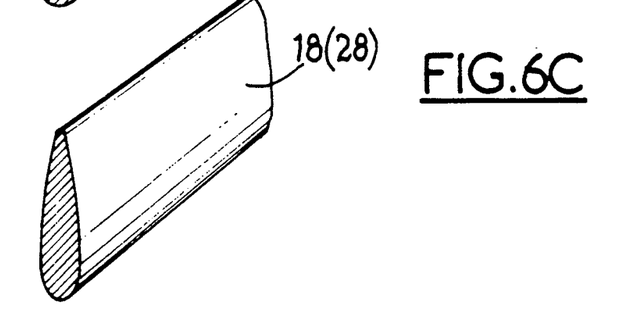

As may be seen in FIGS. 6A, 6B and 6C, the metal leaves, such as the leaves 18 fixed directly and individually on the walls 15 of the structure 14 of a nozzle of a fuel assembly, or such as the leaves 28 of a modular element 30, may have sections of different shapes.

FIG. 6A shows a leaf 18 which has a section of rectangular shape and which may be obtained by cutting out from a metal sheet or from a steel strip.

FIG. 6B shows a leaf 18 having two rounded edges 38a and 38b forming the longitudinal ends of its transverse section.

The presence of rounded edges, such as 38a and 38b, forming the leading and trailing edges of the leaf 18 relative to the flow of cooling water makes it possible to reduce the hydraulic resistance of the leaf 18 interposed in the flow of the cooling water.

A leaf, such as the leaf 18 shown in FIG. 6B, may be obtained by cutting out from a steel strip with rounded edges or by machining a leaf of rectangular section, as shown in FIG. 6A.

In addition, it is possible considerably to reduce the hydraulic resistance of the leaves 18 by using leaves having a section such as that shown in FIG. 6C. Leaves of this type can be obtained from specially rolled steel strips or by machining.

It is possible, for example, to produce a modular single-piece group, such as the groups 30 shown in FIGS. 5A and 5B, comprising profiled leaves such as shown in FIG. 6C, by a machining method as indicated above.

The leaves fixed in the cells of the cross-braced structure may be produced in any material which has good mechanical characteristics in the conditions of use of the fuel assembly and which are resistant to the wear caused by the presence of debris in the cooling water of the reactor.

Use will be made, for example, of a nickel alloy, such as Inconel 718, or of martensitic steel.

In order to produce the leaves and the cross-braced structure of the bottom nozzle of the assembly, it is advantageous to choose materials which have thermal expansion coefficients which are as close as possible. If use is made of materials having substantially different thermal expansion coefficients, it may be necessary to provide leaf shapes permitting a certain differential expansion of the leaves and of the cross-braced structure.

Figure 7:
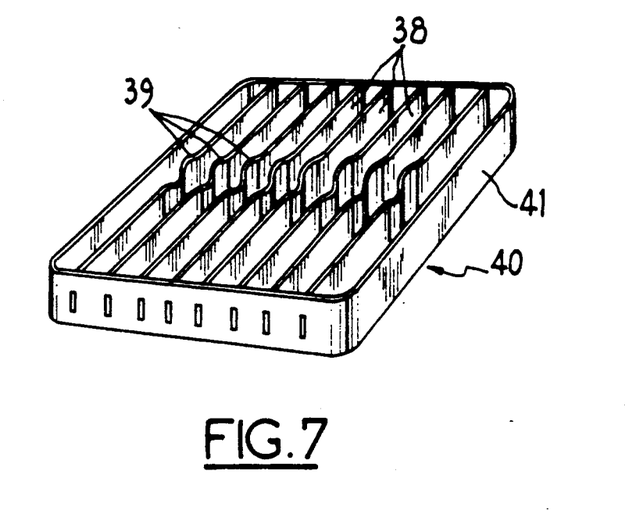
FIG. 7 is a perspective view of a modular filtration element of a nozzle according to the invention, in the case of an alternative embodiment permitting the expansion of the filtration element.

FIG. 7 shows a modular element 40 comprising a frame 41 and leaves 38 fixed on two opposite sides of the frame 41.

In order to permit a differential expansion of the leaves and of the cross-braced structure intended to receive the modular element 40, each of the leaves 38 comprises, in its central part, a zone 39 where the leaf 38 comprises successive undulations permitting its longitudinal expansion.

The bottom nozzle according to the invention, comprising a cross-braced structure and leaves disposed inside cells of the cross-braced structure, has major advantages which will be pointed out below.

The transverse element of the nozzle comprising the cross-braced structure has good rigidity on bending and satisfactorily transmits the forces originating from the fuel assembly to the lower core plate.

The transverse element of the nozzle homogeneously distributes the coolant in the bundle of fuel rods with a low loss of head.

The leaves disposed in the cells of the cross-braced structure make it possible to stop the debris likely to damage the fuel rods.

The nozzle according to the invention makes it possible efficiently to axially retain the fuel rods, while permitting an enlargement of the rods under relatively high irradiation, due to the relatively small dimension of the transverse element of the nozzle in the longitudinal direction of the assembly.

The fact that the leaves retaining the rods and providing filtration of the cooling water are disposed inside the cross-braced structure makes it possible to reduce the height of the nozzle, thus increasing the space available for enlargement of the rods.

The increased possibilities of enlargement of the rods make it possible to use the latter with higher burnup fractions.

The leaves retaining the rods and providing filtration of the cooling water of the assembly may have shapes other than those which have been described and may be fixed on the cross-braced structure of the nozzle in a different manner, either directly and individually, or in groups or modules each fixed inside a cell of the cross-braced structure.

The nozzle according to the invention may be used as a bottom nozzle on a fuel assembly not only of a pressurized water-cooled nuclear reactor, but of a nuclear reactor of any type cooled by light water.

I claim:

1. Filtering bottom nozzle for a fuel assembly of a light water-cooled nuclear reactor, comprising a transverse element (12) for taking up stresses and retaining the rods of the assembly, consisting of a cross-braced structure (14, 14') which is resistant to bending, delimited on the outside by a frame having a cross-section substantially identical to a transverse section of said fuel assembly (1) and having walls (15) delimiting cells (16) which form openings for passage of cooling water of said fuel assembly, said bottom nozzle comprising, inside each of said cells (16, 16'), a plurality of mutually parallel leaves (18, 28) having ends attached to walls of the cell so that faces of said leaves are substantially parallel to a direction of circulation of said cooling water and so as to provide between said leaves spaces of a width which is less than a size of debris particles likely to be entrained by cooling fluid and to become lodged inside said fuel assembly.

2. Bottom nozzle according to claim 1, wherein the leaves (18) are fixed directly and individually on two opposite walls (15) of a cell (16) of the cross-braced structure (14).

3. Nozzle according to claim 2, wherein the ends of the leaves (18) are engaged in longitudinal slots (21) machined in the walls (15) of the cells 16 of the cross-braced structure (14) and brazed inside the slots (21).

4. Nozzle according to claim 2, wherein the ends of the leaves (18) are welded on the walls (15) of the cells (16) of the cross-braced structure (14).

5. Nozzle according to claim 4, wherein the leaves (18) are spot-welded on the walls (15) of the cells (16) of the cross-braced structure (14).

6. Nozzle according to claim 1, wherein the parallel leaves (28) of each of the groups disposed inside a cell (16′) of the cross-braced structure (14′) are connected by ends of said leaves to a frame (31) whose shape corresponds to the shape of the cell (16′), and form a modular filtration element (30) adapted to be welded or brazed on the cross-braced structure (14).

7. Nozzle according to claim 6, wherein the modular elements (30) are metal elements cut out from a metal sheet or a steel strip and assembled together by welding or by brazing.

8. Nozzle according to claim 6, wherein the modular groups (30) are made in a single piece and produced by machining a piece cut out from a thick metal sheet, using a process selected from the group consisting of electro-erosion, electrochemical machining, and cutting out using abrasive jets of water.

9. Nozzle according to any one of claims 6 to 8, wherein the modular elements (30) comprise a reinforcement element (35) fixed on the outer frame (31) of the modular elements (30) on two sides of the frame (30) parallel to the leaves (28) and providing transverse retention of the leaves (28).

10. Nozzle according to claim 1, wherein the leaves (18, 28) are of rectangular section.

11. Nozzle according to claim 1, wherein the leaves (18, 28) are of elongate section with rounded edges.

12. Nozzle according to claim 1, wherein the leaves (18, 28) have a profiled section adapted to reduce hydraulic resistance of the leaves (18, 28) to the passage of the cooling water in the fuel assembly.

13. Nozzle according to claim 1, wherein the leaves (18, 28) consist of a material having a coefficient of expansion close to the coefficient of expansion of the material forming the cross-braced structure (14) of the nozzle (8).

14. Nozzle according to claim 1, wherein the leaves (38) comprise a zone (39) having undulations to permit longitudinal deformation of said leaves through differential expansions of the leaves (38) and of the cross-braced structure (14) of the nozzle.

* * * * *